United States Patent
Hong et al.

(10) Patent No.: US 10,095,381 B2
(45) Date of Patent: Oct. 9, 2018

(54) TASK FLOW PIN FOR A PORTAL WEB SITE

(71) Applicant: ORACLE INTERNATIONAL CORPORATION, Redwood Shores, CA (US)

(72) Inventors: Mei Hong, Mountain View, CA (US); Jeff Marshall, Excelsior, MN (US); Ravi Baranwal, Bangalore (IN); Anandram Kota Rajaram, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 695 days.

(21) Appl. No.: 14/643,310

(22) Filed: Mar. 10, 2015

(65) Prior Publication Data
US 2016/0092046 A1    Mar. 31, 2016

(30) Foreign Application Priority Data
Sep. 29, 2014  (IN) .......................... 4885/CHE/2014

(51) Int. Cl.
| | |
|---|---|
| *G06F 3/00* | (2006.01) |
| *G06F 3/0482* | (2013.01) |
| *H04L 29/06* | (2006.01) |
| *G06F 3/0484* | (2013.01) |

(52) U.S. Cl.
CPC .......... *G06F 3/0482* (2013.01); *G06F 3/0484* (2013.01); *H04L 67/38* (2013.01)

(58) Field of Classification Search
CPC ................................. G06F 8/34; G06F 3/0482
USPC .......................... 717/106; 715/762, 763, 769
See application file for complete search history.

(56) References Cited

U.S. PATENT DOCUMENTS

| | | | |
|---|---|---|---|
| 7,062,511 B1 | 6/2006 | Paulsen | |
| 7,548,957 B1 | 6/2009 | Wichmann et al. | |
| 2009/0313601 A1* | 12/2009 | Baird | G06F 8/34 717/106 |

OTHER PUBLICATIONS

Oracle Data Sheet; "Oracle Webcenter Portal"; last downloaded Jan. 24, 2015.
S. Patil; "What Is a Portlet"; http://www.onjava.com/lpt/a/7442; Sep. 14, 2005.

* cited by examiner

*Primary Examiner* — Andrey Belousov
(74) *Attorney, Agent, or Firm* — Potomac Law Group, PLLC

(57) ABSTRACT

A system that defines, on a user interface, a task flow for a portal web site, provides a first plurality of selections of a display type for the task flow, where each of the first selections displays the display type on the user interface in substantially an identical manner as the display type is displayed on the portal web site. The system provides a second plurality of selections of a content of display for the task flow, where each of the second selections displays the content of display on the user interface in substantially an identical manner as the content of display is displayed on the portal web site. The system receives one of the first plurality of selections of the display type for the task flow and one of the second plurality of selections of the content of display for the task flow. Based on the received selections of the display type and content of display, the system then generates pin data, where the pin data represents the received selections.

20 Claims, 9 Drawing Sheets

TASK FLOW PIN FOR A PORTAL WEB SITE

FIELD

One embodiment is directed generally to a computer system, and in particular to a computer system that generates a portal web site.

BACKGROUND INFORMATION

Generally, a web site is an arrangement of content, such as text, images, and sound, on a set of web pages configured for presentation over a computer network in a predetermined way. The content appearing on a web page is generally stored in a centralized location, such as a database or a set of files, that is local to a web server. Requests for web pages, which are typically transmitted by web browsers via the Hypertext Transfer Protocol ("HTTP") protocol, are processed by the web server. Centralizing the storage of the content found on web pages facilitates its transmission by the web server because the web content is in a known location that is readily available.

Web sites have become more complex as their application has spread. Web sites have proven to be a valuable means of communication both with the public (e.g., a corporate web site) and in private use (i.e., an Intranet site). In either case, it is advantageous to display content with as much breadth and depth as possible to maximize the utility of the web site to its users. However, as web content becomes more complex and diverse, the amount of time, money and effort in obtaining, storing and updating the web content has increased.

More recently, portal web sites, or "web portals", have been used to deliver complex and diverse content over a computer network. A web portal is a web site containing one or more portlets displayed on a web page. A portlet is a configurable content area displayable on a web page that provides content or performs one or more associated functions, or both. Portlets may display content that is obtained from a source remote from the web server. For example, a portal web site may use an arrangement of portlets to display web content on different subject areas. The web content for each of the subject areas need not be stored centrally to the web server, but instead may be stored in a plurality of locations geographically removed, but accessible to the portal web server. A portlet may be configured such that it may display the information it obtains to the web browser in a customized manner.

SUMMARY

One embodiment is a system that defines, on a user interface, a task flow for a portal web site. The system provides a first plurality of selections of a display type for the task flow, where each of the first selections displays the display type on the user interface in substantially an identical manner as the display type is displayed on the portal web site. The system provides a second plurality of selections of a content of display for the task flow, where each of the second selections displays the content of display on the user interface in substantially an identical manner as the content of display is displayed on the portal web site. The system receives one of the first plurality of selections of the display type for the task flow and one of the second plurality of selections of the content of display for the task flow. Based on the received selections of the display type and content of display, the system then generates pin data, where the pin data represents the received selections.

DETAILED DESCRIPTION

One embodiment provides a pin data driven task flow view that allows reusable task flows for a portal web site to be defined in a "view" mode and then saved as pin data within the page itself. Therefore, subsequent views of the task flow display the data in an identical view format as when originally defined using the pin data. This can be done on a per user level, a per page level, or a per portal level.

Typically, for a portal web site, a user may want to display content from different libraries and folders, on different pages, and in different display formats (e.g., table, list, thumbnail, etc.), as well as specify the order that the documents sorted, what is the sort criteria, etc. Pin generation "on the fly" using embodiments of the present invention allow a user to specify an ever expandable set of parameters in a JavaScript Object Notation ("JSON") format, where each such parameter controls some aspect of the user interface, making UI customization very extensible. The generated pin is then stored against each such reusable usage/instance of the UI in JSON format, making pinned views generated from one set of users reusable by others in a declarative fashion.

Figure 1:
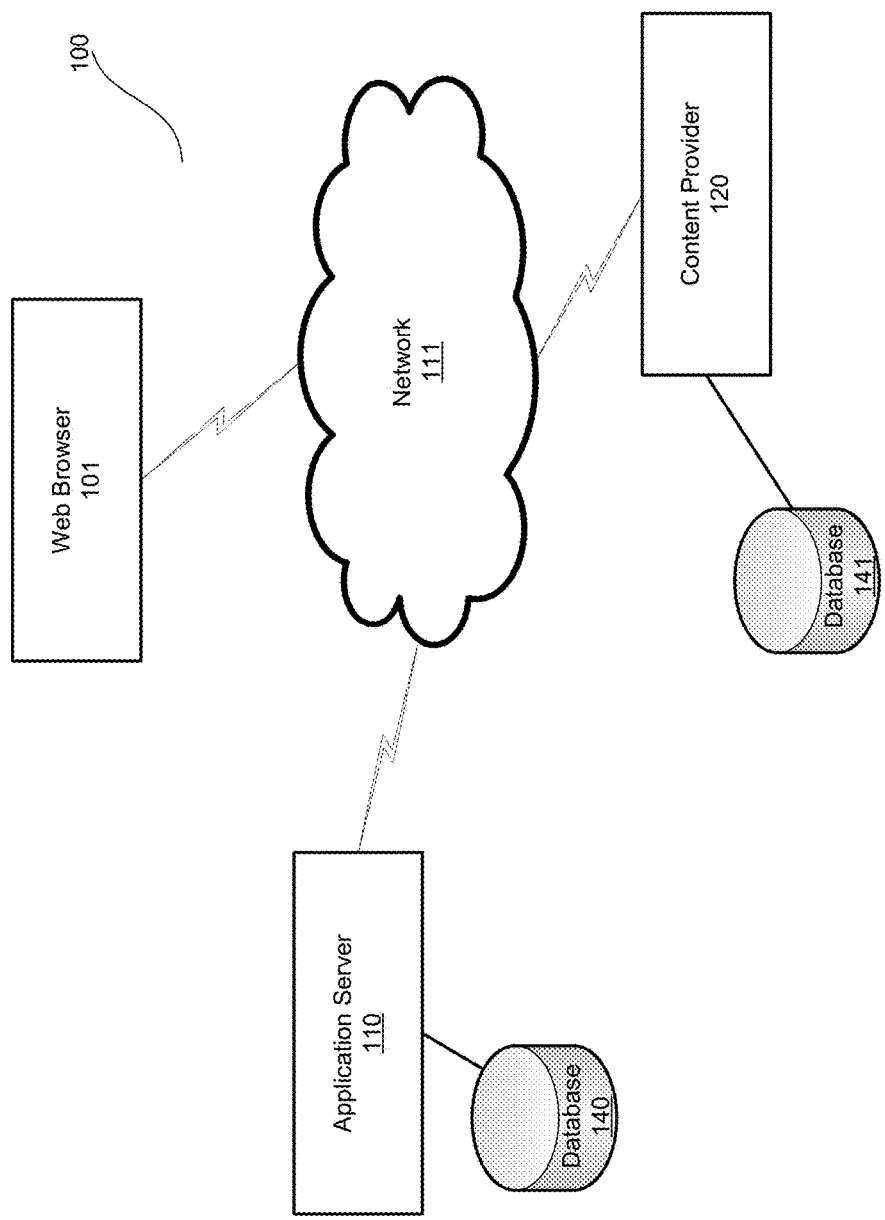
FIG. 1 is an overview diagram of a portal management system including network elements that implement embodiments of the present invention and/or interact with embodiments of the present invention.

FIG. 1 is an overview diagram of a portal management system 100 including network elements that implement embodiments of the present invention and/or interact with embodiments of the present invention. Portal management system 100 allows a user to manage the appearance and operation of a web site and the content appearing on the web site. Portal management system 100 includes a web browser 101, an application/web server 110, databases 140, 141, and a content provider 120.

A web browser 101 is any device capable of browsing content over a computer network 111, such as the Internet, and is operatively connected to application server 110. While only one web browser 101 is shown in FIG. 1, multiple web browsers 101 may be operatively connected to application server 110. Web browser 101 and application server 110 may communicate over computer network 111 using well-known communication protocols, such as Transmission Control Protocol ("TCP") and Internet Protocol ("IP"), or TCP/IP, HTTP and Extensible Markup Language ("XML").

In one embodiment, application server 110 is a well-known component that assembles and serves web pages to one or more web browsers 101. Application server 110 in one embodiment functions as an underneath middleware framework, and further includes applications such as Java 2 Platform, Enterprise Edition ("J2EE") applications. As such, application server 110 may serve web pages containing one or more portlets. A portlet is a configurable content area displayable on a web page that displays content obtained from a source remotely to the web server, or performs one or more functions remotely to the web server. A portlet may be configured such that it may display customized information to a user.

A content provider 120 is a functional component that provides content for a portlet in response to requests from application server 110. Content provider 120 in one embodiment is software operating on a separate hardware device other than that executing application server 110. In other embodiments, the functionality of content provider 120 and application server 110 can be implemented on the same network element. In some embodiments, content provider 120 may be implemented using a cross-platform component architecture such as the JavaBean architecture. Such an embodiment is advantageous when deploying content providers 120 over multiple platforms.

Application server 110 assembles the requested web page using any content received from content provider 120 and data stored in an associated central repository concerning the organization and presentation of the web page. In one embodiment, the data stored in the central repository that application server 110 uses in assembling the requested web page includes data concerning the following attributes of the web page: style, layout, content resident thereon, portlets displayed thereon, items displayed thereon, groups, folders and user permissions for the web page. In other words, application server 110 manages data concerning the appearance and operation of portal web sites in a central repository, such as a database, and uses that information to assemble the web page, along with content received from content providers 120. The data application server 110 uses in rendering web pages may be directed towards visual aspects of the page (e.g., style or layout information), or it may be directed towards operational aspects of the page (e.g., what portlets are displayed, permissions regarding access to portions of the web page, etc.).

In embodiments of the invention, web pages are dynamically generated based upon data stored in tables in a database. In some embodiments, the content of the web page and generated pin data are all stored in tables in a database, including databases 140, 141.

Figure 2:
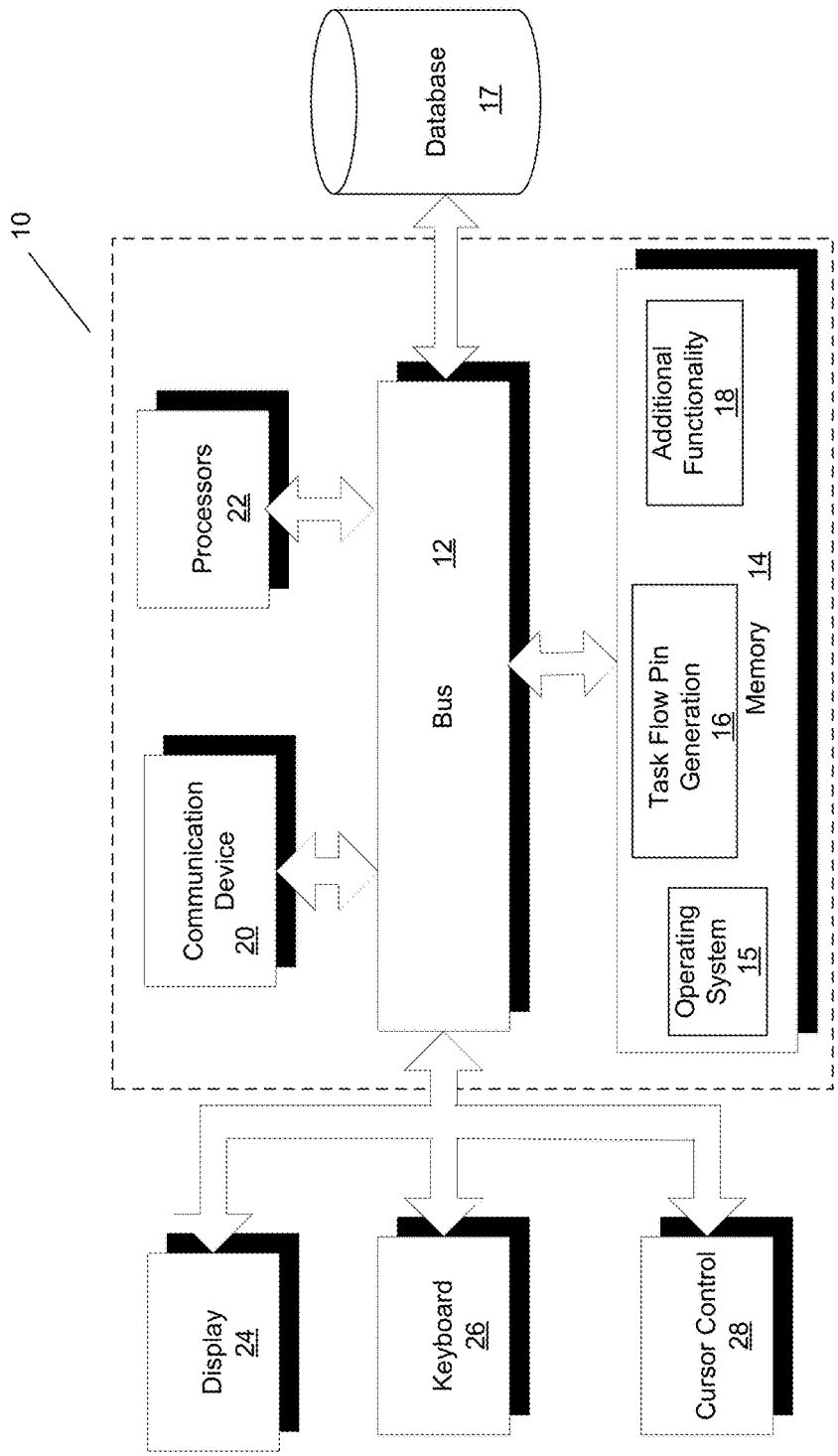
FIG. 2 is a block diagram of a computer server/system in accordance with an embodiment of the present invention.

FIG. 2 is a block diagram of a computer server/system 10 in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of application server 110, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a task flow pin generation module 16 for generating a task flow pin, and a portal based on the pin, and all other functionality disclosed herein. System 10 can be part of a larger system, such as added functionality to "WebCenter Portal" from Oracle Corp. Therefore, system 10 can include one or more additional functional modules 18 to include the additional functionality. A database 17 is coupled to bus 12 to provide centralized storage for modules 16 and 18.

Known tools for generating and managing content related to portals, such as the "WebCenter Content" or "WebCenter Portal 11g", from Oracle Corp., include reusable task flows that provide access to the underlying content management system. These task flows provide a host of functionality, such as which library or a folder within a library to display, in what format, what is the sort criteria when the content is displayed, and so on. The number of possible options that can be chosen to configure the display is very high. However, display configuration requirements for these task flows, which utilize task flow parameters, vary across deployments. Using these known portal generation tools, the appearance of task flows when displayed on a portal can vary, and the configuring of these task flows therefore do not accommodate a "What You See Is What You Get" ("WYSIWYG") user interface.

In contrast to known task flow configuration systems, embodiments of the present invention allow a user to enter a "configure" WYSIWYG mode of the task flow where the task flow is defined as if the user is interacting with it. Embodiments allow a user to browse through an entire content server and settle on a single library/folder that is desired to display in the task flow, define various configuration in the user interface ("UI") that dictate what format to display data, add additional filtering criteria (e.g., all documents that are checked out by the user, all documents modified since x time, etc.). Once the user is satisfied with the end result, the entire task flow definition is saved as a "pin". In one embodiment, the pin is saved in a JavaScript Object Notation ("JSON") format. The generated pin is a representation of the entire UI state at the current point of time and this data is then saved into the current page. Any user that now visits this page will see the display as pre-defined by the pin.

The generated pin provides for the ability to create a persistent link to a particular view state in the UI (e.g., a particular listing, complete with folder location, filtering, search criteria, etc.). The link is specific to the task flow instance in the portal page and is passed to it as a task flow parameter.

In one embodiment, the pin is created by editing the page containing the content manager task flow and storing the pinnable state. The creating the pin functionality includes creating a page that will contain the task flow. The page containing the task flow is then edited, and a "configure" button for the task flow that is desired to be pinned is selected.

This opens up a modal dialog which displays the task flow being pinned. The reusable UI is set the way it is desired (e.g., a particular listing, complete with folder location, filtering, search criteria, etc.). Clicking "save" stores the pinnable state as a task flow parameter (e.g., a JSON string) in the region definition of the page definition.

Figure 3:
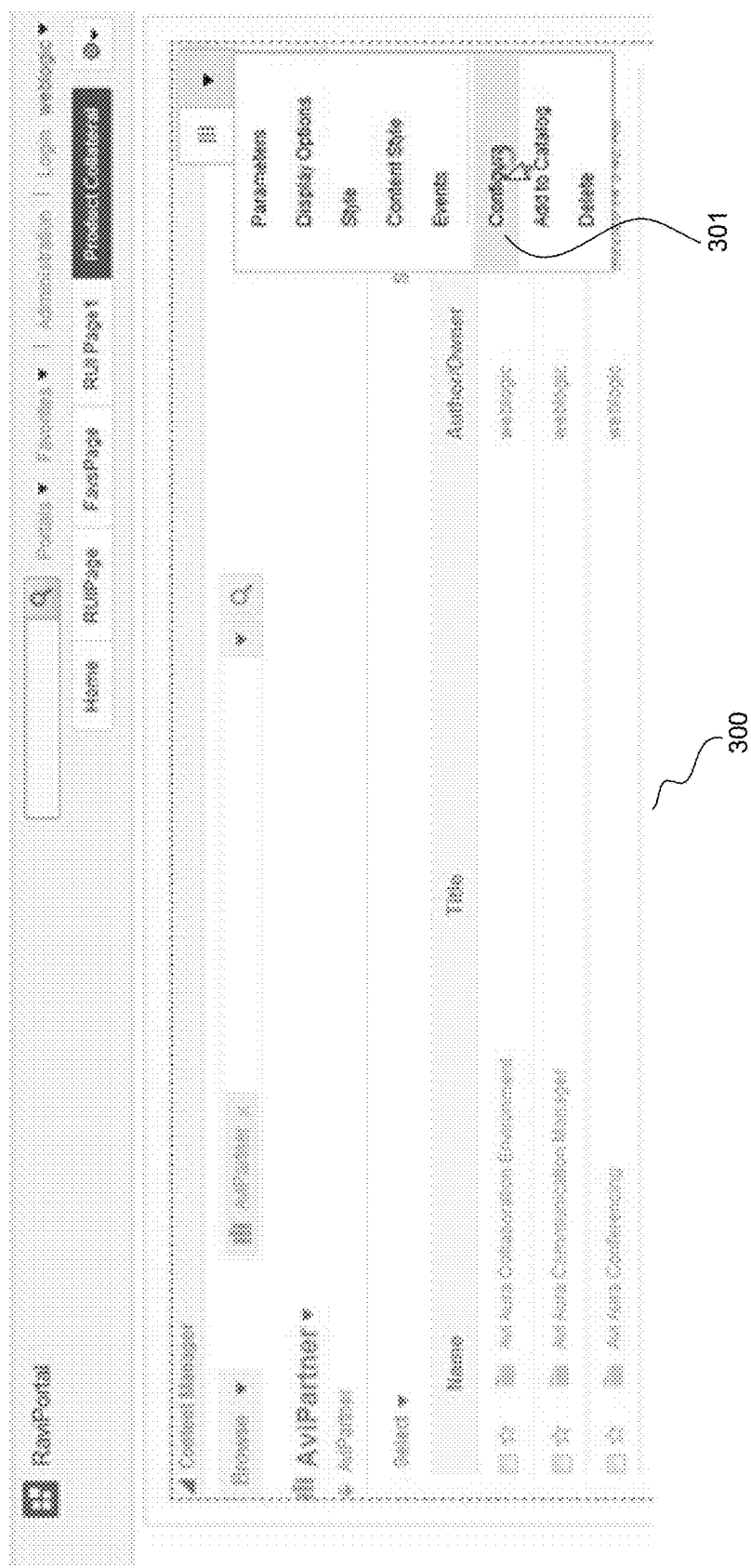
FIG. 3 is a screenshot for adding a task flow to a page, and for entering a task flow definition mode in accordance with one embodiment.

Screenshots shown in FIGS. 3-6 below display the pin definition process in accordance with one embodiment. FIG. 3 is a screenshot 300 for adding a task flow to a page, and for entering a task flow definition mode in accordance with one embodiment. In FIG. 3, a user can select the "configure" option at 301.

Embodiments provide the task flow definition in a WYSIWYG mode. A user selects the display type (e.g., list, thumbnail, tabular, query, etc.), selects exactly what to display (e.g., document, folders, content matching dynamic queries (e.g., all documents created by me, all documents checked out by me, all documents added in a Portal in last x days and so on)).

Figure 4:
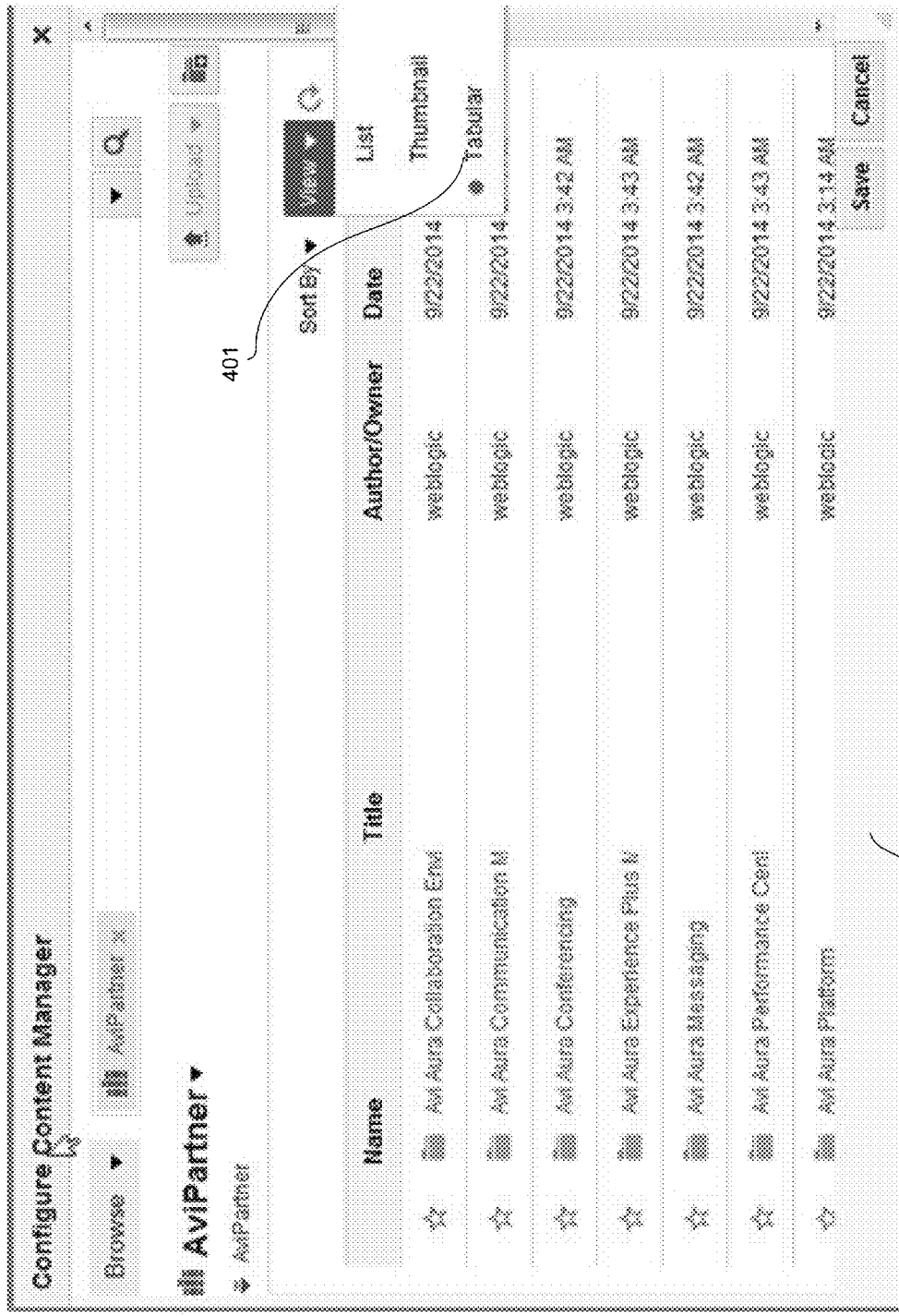
FIG. 4 is a screenshot for selecting the display type in accordance with one embodiment.

FIG. 4 is a screenshot 400 for selecting the display type in accordance with one embodiment. In FIG. 4, a user has selected "tabular" at 401, and the content is shown in tabular form.

Figure 5:
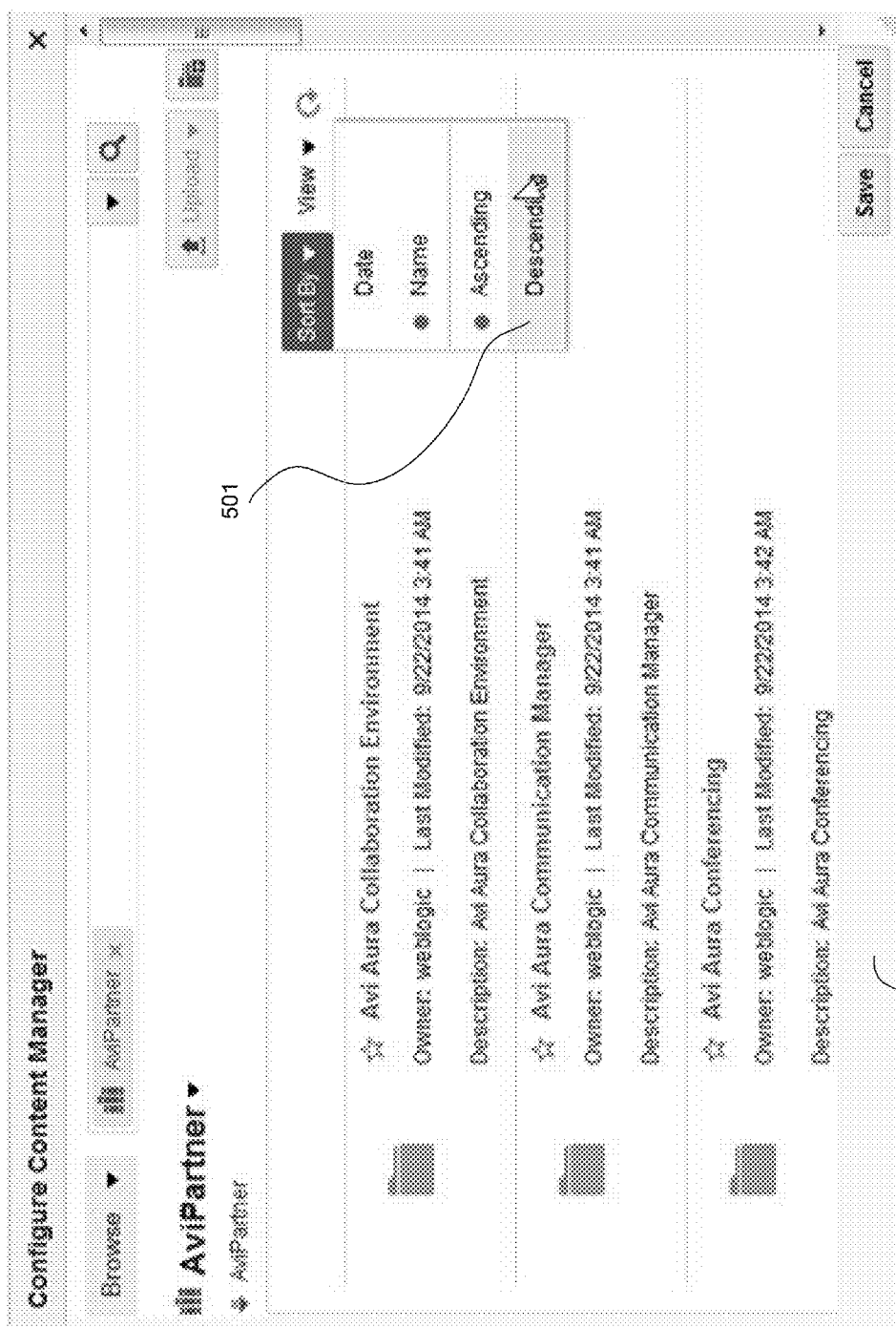
FIG. 5 is a screenshot for further selecting display information in accordance with one embodiment.

FIG. 5 is a screenshot 500 for further selecting display information in accordance with one embodiment. In FIG. 5, a user has selected "descending" sort by at 501, and the content is shown in descending tabular form.

Figure 6:
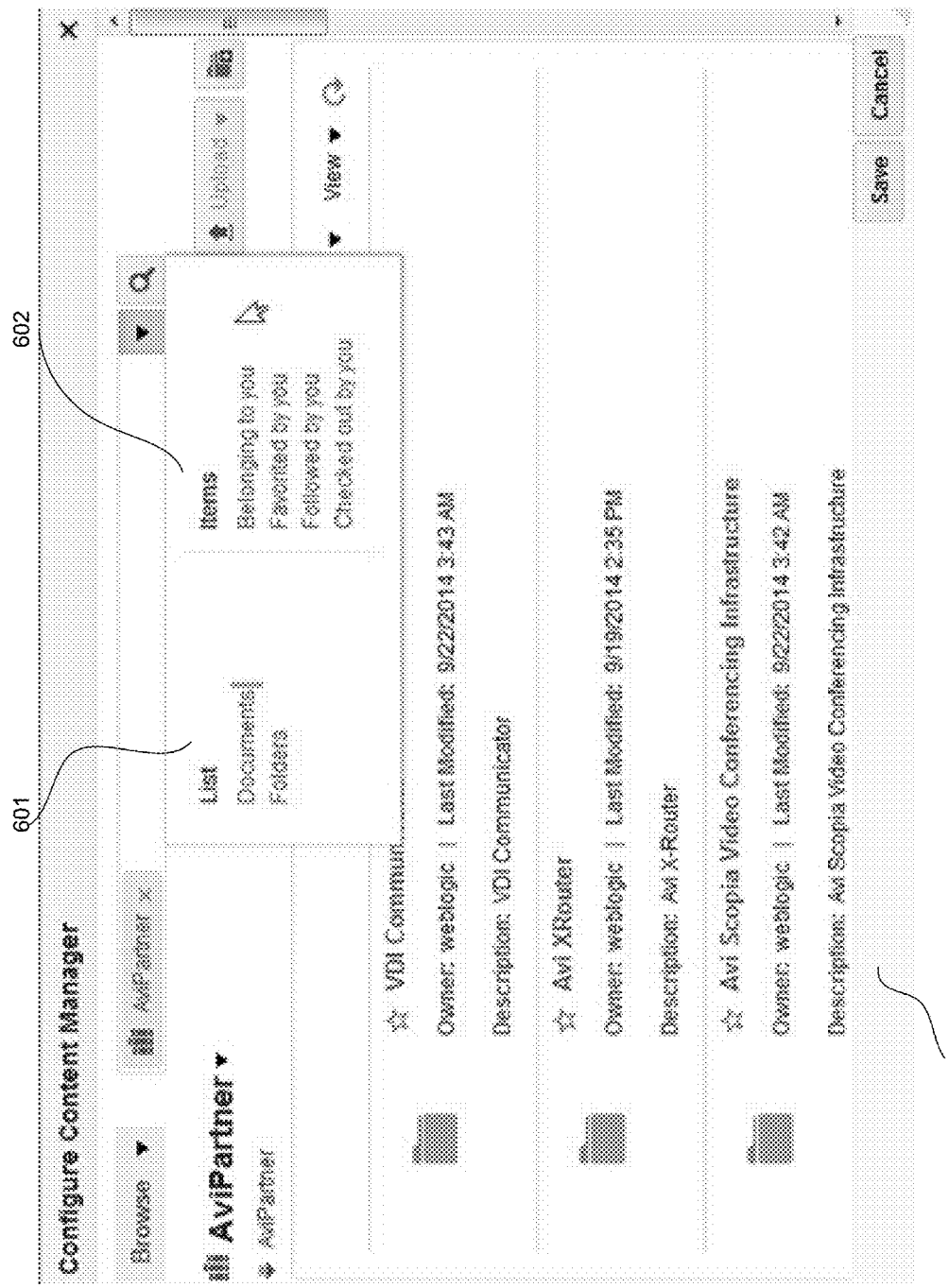
FIG. 6 is a screenshot for further selecting what to display in accordance with one embodiment.

FIG. 6 is a screenshot 600 for further selecting what to display in accordance with one embodiment. In FIG. 6, at 601 the user can select "document" or "folders", and at 602 that user can select the items to be displayed.

Once the task flow definition is complete by, for example, using the screenshots of FIGS. 3-6, a user "saves" the current selection. This generates "pin" data which represents the complete current UI selection. Subsequent visits to the portal results in a rendering of the task flow in exactly the shape defined for this task flow instance. Users can further "define the pin" per user level. Further, once a pin has been defined, a user can publish the task flow pin in its entirety into "resource catalogs" from where other instances can reuse this defined display. Subsequent rendering of the page will show the "pinned" UI rather than the default UI.

Figure 7:
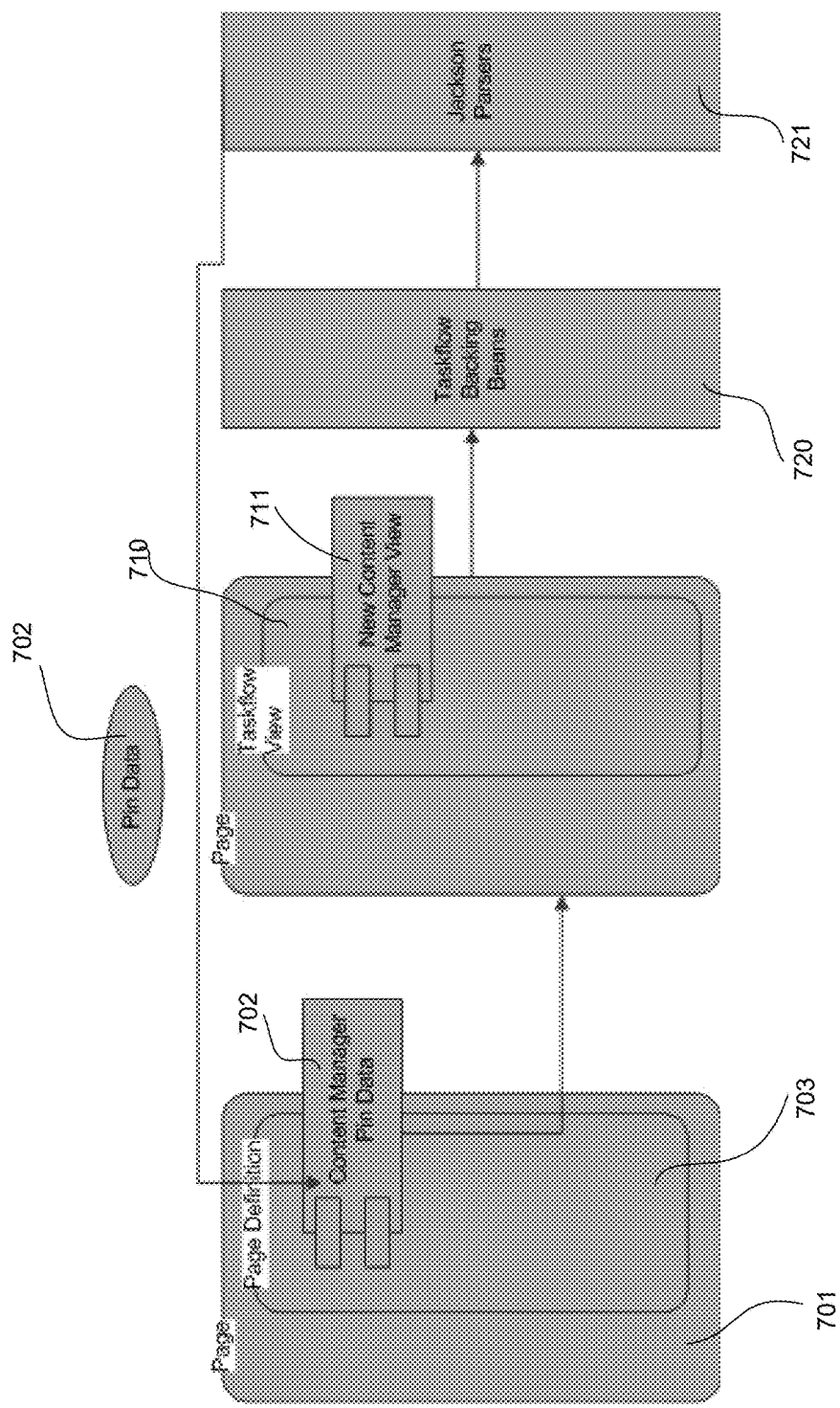
FIG. 7 is a block diagram illustrating the high level architecture of pin generation, storage and its usages in a task flow display within a portal in accordance with one embodiment.

FIG. 7 is a block diagram illustrating the high level architecture of pin generation, storage and its usages in a task flow display within a portal in accordance with one embodiment. The page 701 includes a content manager task flow, and the current visualization is stored in page definition 703 as "pin" data 702. The user configures the task flow in "definition mode", and defines the view based on the user's preferences as a task flow view 710. The user then triggers "save" to save the current view 711. This triggers an action on backing beans for the task flow 720. The backing beans store the entire current state and use this information to generate pin data in JSON format by calling necessary parsing using, for example, Jackson APIs to initiate a Jackson Parser 721. Once the JSON data is generated, the data is handed over to the triggering call which stores the "pin" data in the page's page definition 703.

A UI state of the content manager task flow in one embodiment includes the following:
   A page type: document list, library list, favorite list, folder list, or rendition clipboard.
   A query for returning items on the list:
      a Document query:
         Folder/Library context;
         Search or browse;
         Query text (defined by any combination of search bar text, search bar filters, facet navigation, search form, and query folder definition).
         Sort field and sort order
      Library query:
         Query text (defined by any combination of search bar text and search bar filters).
      Favorite query:
         Query text (defined by search bar text).
      Folder query:
         Query text (defined by any combination of search bar text and search bar filters).
      Rendition clipboard query:
         Query text (defined by search bar text).
   Optionally a query folder context and its source context.
   A view: list view, thumbnail view, or tabular view.

In one embodiment, the pin mechanism allows the display of the task flow to be completely extensible. Specifically, when new functionality gets added to the task flow, it can be defined by anyone using the pin definition. In contrast, with known portal generation tools, the display is controlled by task flow parameters, which provide limited functionally. With task flow parameters, a user needs to expose the task flow parameter for every functionality and there is no availability of a runtime WYSIWYG experience for task flow.

Figure 8:
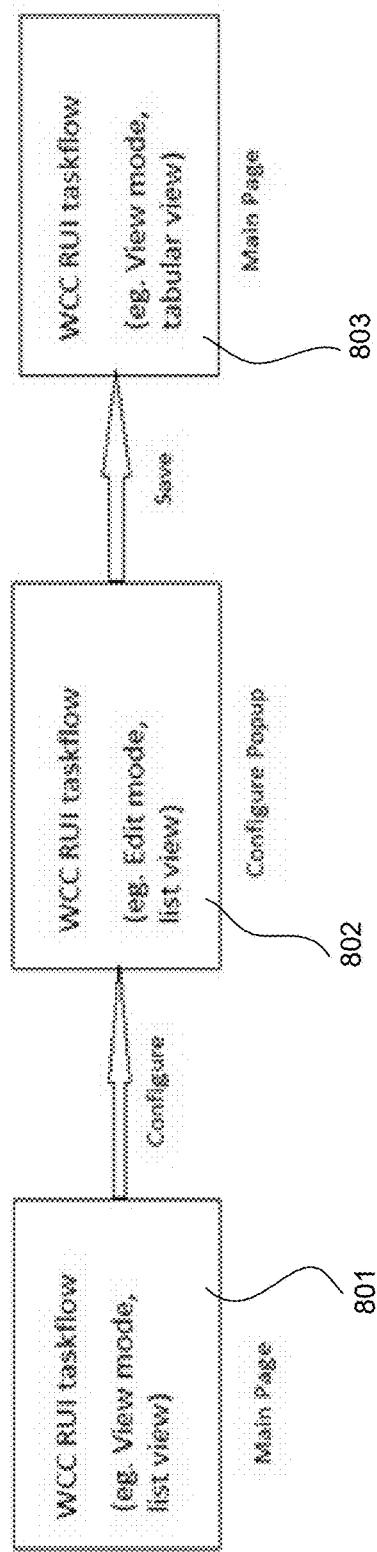
FIG. 8 is a block diagram of the content manager task flow changes in accordance to an embodiment.

FIG. 8 is a block diagram of the content manager task flow changes in accordance to an embodiment. From the main page at 801, the configure option on a floating menu for the WebCenter Content ("WCC") task flow is enabled by the task flow integration with the page editor declaratively. This allows the task flow to be taken into configuration mode 802 in a generic fashion.

Since a popup needs to be shown on a click of a configure option, a view (.jsff) is added in wrapper task flow, with two regions each having an instance of the content manager task flow. One region is rendered when the task flow is dropped onto a page from a resource catalog while the other will be rendered on a selection of the configure option.

Once the user has completed the selection, the selection of "Save" in the configure popup triggers the pin generation by queuing an action event on the content manager task flow, and returns to main page view 803. In save listener, the generated pin is updated in a page definition file against the task flow parameter. The content manager task flow's "pin"

generation listener is bound to the current instance's view. Once "Save" is triggered, a "pin" is generated to reflect the current UI state.

Pins are created in JSON format in one embodiment. During a pin's creation, properties and objects in managed beans are serialized to a JSON string. During a pin's restoration, properties and objects are deserialized from a JSON string and then set to managed beans. Helper Plain Old Java Objects ("POJOs") and conversion methods are defined to work with a Jackson JSON processor, improving the efficiency of JSON serialization/deserialization even further. The Jackson ObjectMapper is configured to skip unrecognizable properties during deserialization, thus allowing certain degree of flexibility in POJO models and leniency towards old pins.

The pin in general captures a document and/or folder query. When a pin is restored, the results of that query is rendered on the UI. The results of the same query could vary from user to user and time to time. For example, if a "Checked Out By Me" filter is applied in a pin, the results would likely show a different list of documents for user A in comparison for user B, as users A and B usually would have checked out a different set of documents.

Figure 9:
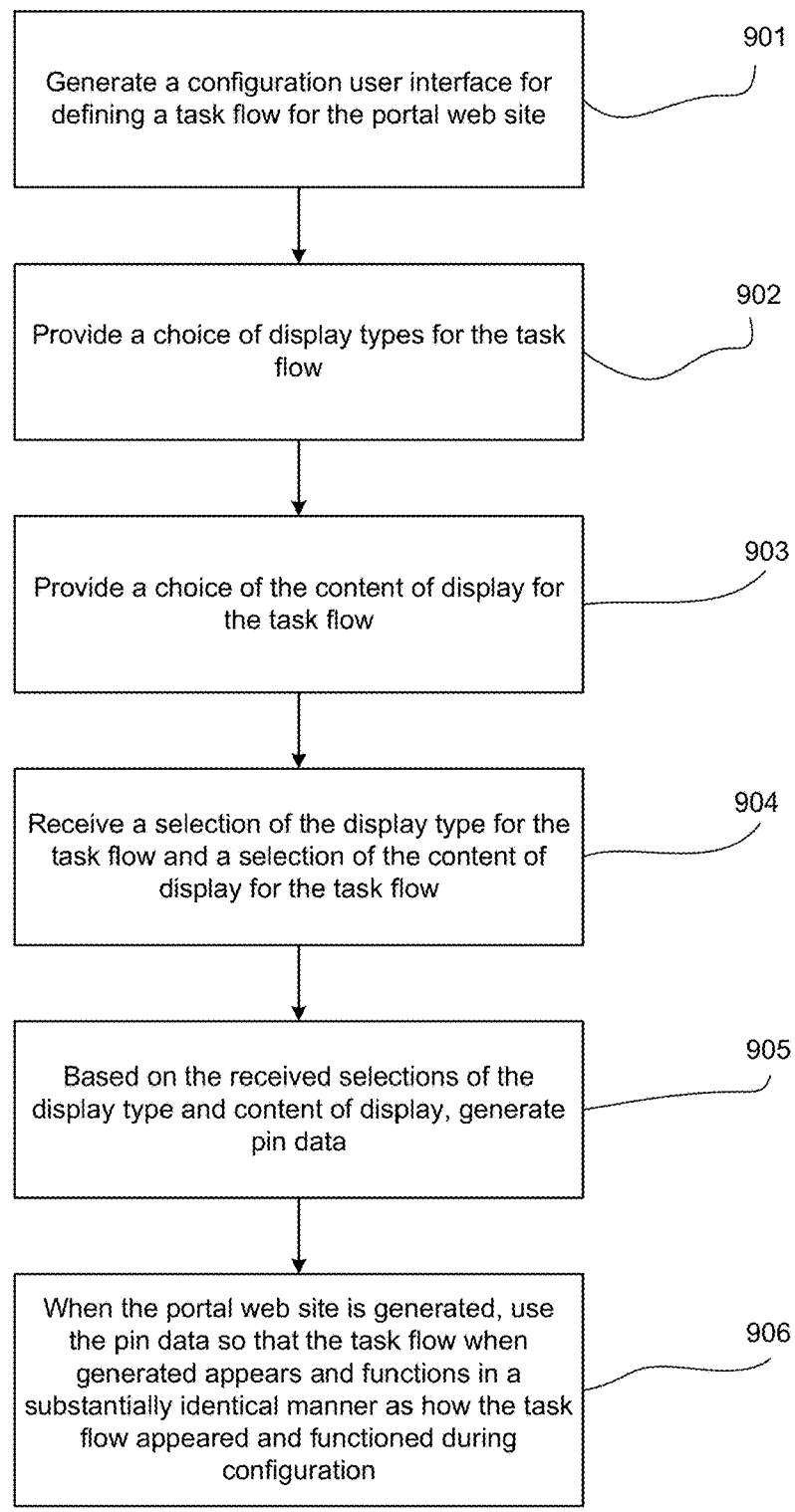
FIG. 9 is a flow diagram of the functionality of the system of FIG. 1 when generating a portal task flow and associated pin in accordance with an embodiment.

FIG. 9 is a flow diagram of the functionality of system 10 of FIG. 1 when generating a portal task flow and associated pin in accordance with an embodiment. In one embodiment, the functionality of the flow diagram of FIG. 9 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 901, a configuration user interface is generated for defining a task flow for the portal web site.

At 902, the UI provides a choice of display types for the task flow. Examples of choices of display types include list, thumbnail, tabular, query, etc. When a display type is selected, the UI displays the display type on the UI in substantially an identical manner as the display type is displayed on the portal web site when generated (i.e., WYSIWYG).

At 903, the UI provides a choice of the content of display for the task flow. Examples of content includes document, folders, content matching dynamic queries, etc. When a content is selected, the UI displays the content of display on the UI in substantially an identical manner as the content of display is displayed on the portal web site when generated (i.e., WYSIWYG).

At 904, the UI receives a selection of the display type for the task flow and a selection of the content of display for the task flow.

At 905, based on the received selections of the display type and content of display, pin data is generated, where the pin data represents the received selections.

The following is example pseudo-code of pin data saved in a JSON format in accordance with one embodiment at 905:

```
{
    "query-type":"document-query",
    "view-type":"tabular",
    "document-query":
    {
        "folder-id":"12345000",
        "checked-out-by-me-filter":true,
        "favorited-by-me-filter":false,
        "sort-field":"Name"
        "sort-direction":"ascending",
    },
    "folder-query":null
}
```

At 906, when the portal web site is generated, the pin data is used so that the task flow when generated appears and functions in a substantially identical manner as how the task flow appeared and functioned during configuration.

The following is example pseudo-code to generate a task flow based on the above pin data example in accordance with one embodiment at 906:

```
{
    // invoke Jackson Parser to parse the JSON string
    // and construct a POJO instance representing the pin
    pinObject = parseJsonString(pinData);
    // extract the view type from pin and set it to UI page
    pageBean.setViewType(pinObject.getViewType( ));
    // extract the query type from pin and set it to UI page
    pageBean.setQueryType(pinObject.getQueryType( ));
    if (query is document query)
    {
        // set which folder to browse
        pageBean.setFolder(pinObject.getFolder( ));
        // apply filters
        if (pinObject.isCheckedOutByMeFilterApplied( ))
        {
            pageBean.applyCheckOutByMeFilter( );
        }
        if (pinObject.isFavoritedByMeFilterApplied( ))
        {
            pageBean.applyFavoritedByMeFilter( );
        }
        // set sort field and order
        pageBean.setSortField(pinObject.getSortField( ));
        pageBean.setSortOrder(pinObject.getSortOrder( ));
    }
    else if (query is folder query)
    {
        // set up folder query on the UI
    }
}
```

As disclosed, embodiments allow a user to define a task flow for a portal web site in a WYSIWYG manner. The resultant definition is stored as pin data, in JSON format in one embodiment. When the portal/task flow is then generated, the pin data is used to enforce the WYSIWYG development.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of defining, on a user interface, a task flow for a portal web site, the method comprising:

providing a first plurality of selections of a display type for the task flow, wherein each of the first selections displays the display type on the user interface in substantially an identical manner as the display type is displayed on the portal web site;

providing a second plurality of selections of a content of display for the task flow, wherein each of the second selections displays the content of display on the user interface in substantially an identical manner as the content of display is displayed on the portal web site;

receiving, from a user, one of the first plurality of selections of the display type for the task flow and one of the second plurality of selections of the content of display for the task flow, wherein the one of the second plurality of selections comprises one or more queries to retrieve content and one or more filters to filter the retrieved content, the one or more filters defining a user level filter for the retrieved content;

displaying a view of a user interface element for the task flow that is configured according to the received one of the first plurality of selections and one of the second plurality of selections; and generating a pin data that comprises at least the one or more queries and the one or more filters, the pin data representing the view of the user interface element, wherein, when the user interface element is rendered on the portal website for a given user using the pin data, the one or more queries are executed to retrieve content, the retrieved content is filtered according to the given user as defined by the one or more filters, and the retrieved and filtered content is displayed in the user interface element on the portal website.

2. The method of claim 1, further comprising:
generating the portal web site based on the pin data, wherein the generated portal web site comprises the task flow.

3. The method of claim 2, wherein the pin data comprises a JavaScript Object Notation (JSON) string.

4. The method of claim 1, wherein the first plurality of selections of the display type comprise at least one of a list, a thumbnail, tabular or query.

5. The method of claim 1, wherein the second plurality of selections of the content of display comprise at least one of document, folders or content matching dynamic queries.

6. The method of claim 1, further comprising publishing the pin data in a resource catalog.

7. The method of claim 3, wherein the generating the portal web site comprises:
invoking a Jackson Parser to parse the JSON string;
constructing a Plain Old Java Objects (POJO) instance to represent the pin data;
extracting a view type from the POJO instance; and
extracting a query type from the POJO instance.

8. A computer-readable medium having instructions stored thereon that, when executed by a processor, cause the processor to define, on a user interface, a task flow for a portal web site, the defining comprising:
providing a first plurality of selections of a display type for the task flow, wherein each of the first selections displays the display type on the user interface in substantially an identical manner as the display type is displayed on the portal web site;
providing a second plurality of selections of a content of display for the task flow, wherein each of the second selections displays the content of display on the user interface in substantially an identical manner as the content of display is displayed on the portal web site;
receiving, from a user, one of the first plurality of selections of the display type for the task flow and one of the second plurality of selections of the content of display for the task flow, wherein the one of the second plurality of selections comprises one or more queries to retrieve content and one or more filters to filter the retrieved content, the one or more filters defining a user level filter for the retrieved content;

displaying a view of a user interface element for the task flow that is configured according to the received one of the first plurality of selections and one of the second plurality of selections; and generating a pin data that comprises at least the one or more queries and the one or more filters is rendered on the portal website for a given user using the pin data, the pin data representing the view of the user interface element, wherein, when the user interface element, the one or more queries are executed to retrieve content, the retrieved content is filtered according to the given user as defined by the one or more filters, and the retrieved and filtered content is displayed in the user interface element on the portal website.

9. The computer-readable medium of claim 8, the defining further comprising:
generating the portal web site based on the pin data, wherein the generated portal web site comprises the task flow.

10. The computer-readable medium of claim 9, wherein the pin data comprises a JavaScript Object Notation (JSON) string.

11. The computer-readable medium of claim 8, wherein the first plurality of selections of the display type comprise at least one of a list, a thumbnail, tabular or query and the second plurality of selections of the content of display comprise at least one of document, folders or content matching dynamic queries.

12. The computer-readable medium of claim 8, further comprising publishing the pin data in a resource catalog.

13. The computer-readable medium of claim 10, wherein the generating the portal web site comprises:
invoking a Jackson Parser to parse the JSON string;
constructing a Plain Old Java Objects (POJO) instance to represent the pin data;
extracting a view type from the POJO instance; and
extracting a query type from the POJO instance.

14. A portal web site generation system comprising:
a processor; and
a user interface coupled to the processor;
wherein the processor provides a first plurality of selections of a display type for a task flow, wherein each of the first selections displays the display type on the user interface in substantially an identical manner as the display type is displayed on the portal web site;
wherein the processor provides a second plurality of selections of a content of display for the task flow, wherein each of the second selections displays the content of display on the user interface in substantially an identical manner as the content of display is displayed on the portal web site;
wherein the processor causes a display of a view of a user interface element for the task flow that is configured according to the received one of the first plurality of selections and one of the second plurality of selections;
wherein the processor generates a pin that comprises at least the one or more queries and the one or more filters, the pin data representing the view of the user interface element, wherein, when the user interface element is rendered on the portal website for a given user using the pin data, the one or more queries are executed to retrieve content, the retrieved content is filtered according to the given user as defined by the one or more filters, and the retrieved and filtered content is displayed in the user interface element on the portal website.

15. The portal web site generation system of claim 14, the processor further generates the portal web site based on the pin data, wherein the generated portal web site comprises the task flow.

16. The portal web site generation system of claim 15, wherein the pin data comprises a JavaScript Object Notation (JSON) string.

17. The portal web site generation system of claim 16, the processor generates the portal web site by:
   invoking a Jackson Parser to parse the JSON string;
   constructing a Plain Old Java Objects (POJO) instance to represent the pin data;
   extracting a view type from the POJO instance; and
   extracting a query type from the POJO instance.

18. The portal web site generation system of claim 14, wherein the first plurality of selections of the display type comprise at least one of a list, a thumbnail, tabular or query and the second plurality of selections of the content of display comprise at least one of document, folders or content matching dynamic queries.

19. The method of claim 1, wherein one or more queries comprise at least a document query and a folder identifier that defines the document query.

20. The method of claim 1, wherein the content displayed in the user interface element when rendered on the portal website is different for different users based on the user level filter.

* * * * *

UNITED STATES PATENT AND TRADEMARK OFFICE
CERTIFICATE OF CORRECTION

PATENT NO. : 10,095,381 B2  
APPLICATION NO. : 14/643310  
DATED : October 9, 2018  
INVENTOR(S) : Hong et al.

Page 1 of 1

It is certified that error appears in the above-identified patent and that said Letters Patent is hereby corrected as shown below:

In the Specification

In Column 6, Line 20, delete "a Document" and insert -- Document --, therefor.

Signed and Sealed this  
Thirty-first Day of December, 2019

Andrei Iancu  
*Director of the United States Patent and Trademark Office*